(12) United States Patent
Brunhuber et al.

(10) Patent No.: US 10,082,341 B2
(45) Date of Patent: Sep. 25, 2018

(54) HEAT ACCUMULATOR FOR POWER PLANT CAPACITIES

(71) Applicant: Siemens Aktiengesellschaft, Munich (DE)

(72) Inventors: Christian Brunhuber, Auerbach (DE); Horst Oerterer, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 420 days.

(21) Appl. No.: 14/390,976

(22) PCT Filed: Mar. 21, 2013

(86) PCT No.: PCT/EP2013/055914
§ 371 (c)(1),
(2) Date: Oct. 6, 2014

(87) PCT Pub. No.: WO2013/152934
PCT Pub. Date: Oct. 17, 2013

(65) Prior Publication Data
US 2015/0114590 A1 Apr. 30, 2015

(30) Foreign Application Priority Data
Apr. 10, 2012 (DE) .................. 10 2012 205 771

(51) Int. Cl.
*F28D 17/00* (2006.01)
*F28D 19/00* (2006.01)
(Continued)

(52) U.S. Cl.
CPC ........... *F28D 17/005* (2013.01); *F28D 17/04* (2013.01); *F28D 20/0056* (2013.01);
(Continued)

(58) Field of Classification Search
CPC .... F28D 17/005; F28D 17/14; F28D 20/0056; F28D 2020/0021; F28D 2020/0069;
(Continued)

(56) References Cited

U.S. PATENT DOCUMENTS 2,272,108 A * 2/1942 Bradley .................... C21B 9/00
165/4
3,136,607 A 6/1964 Logan
(Continued)

FOREIGN PATENT DOCUMENTS

| CN | 1051244 A | 5/1991 |
|---|---|---|
| CN | 101226035 A | 7/2008 |

(Continued)

OTHER PUBLICATIONS

EP Article 94 Examination Report dated Apr. 5, 2017, for EP patent application No. 13713796.4.

*Primary Examiner* — Jason Thompson
(74) *Attorney, Agent, or Firm* — Beusse Wolter Sanks & Maire (57) ABSTRACT

A heat store for storing at least 100 MWh of thermal energy of a relatively warmer gas in a charging state and for giving off thermal energy to a relatively colder gas in a discharging state is provided. In the charging state, the heat store has at least one inflow surface, provided with inflow openings, for introducing the gas, and at least one outflow surface, provided with outflow openings, for discharging the gas after giving off heat to a granular heat storage medium, wherein the inflow surface is formed at least in certain portions into a channel which is surrounded, in particular completely, by the outflow surface, and wherein an intermediate space in which the granular heat storage medium is arranged is defined between the inflow surface and the outflow surface.

16 Claims, 4 Drawing Sheets

(51) Int. Cl.
  *F28D 7/00* (2006.01)
  *F28F 9/22* (2006.01)
  *F28D 20/00* (2006.01)
  *F28D 17/04* (2006.01)
  *F28F 9/02* (2006.01)

(52) U.S. Cl.
  CPC ............ *F28D 2020/0017* (2013.01); *F28D 2020/0021* (2013.01); *F28D 2020/0069* (2013.01); *F28D 2020/0078* (2013.01); *F28F 9/0273* (2013.01); *Y02E 60/142* (2013.01)

(58) Field of Classification Search
  CPC ..... F28D 2020/0086; F28D 2020/0004; F28D 2020/006; F28D 2020/0065; F28D 17/04; F28D 19/02; F28D 19/045; F28D 2020/0008; F28D 2020/0017; F28D 7/12; F28F 9/0273; Y02E 60/142
  See application file for complete search history.

(56) References Cited

U.S. PATENT DOCUMENTS

| | | | |
|---|---|---|---|
| 4,024,910 A | 5/1977 | Werner | |
| 4,051,891 A * | 10/1977 | Harrison | F24D 11/006 126/400 |
| 4,081,024 A | 3/1978 | Dufour | |
| 4,194,496 A | 3/1980 | Carlson | |
| 4,323,113 A | 4/1982 | Troyer | |
| 4,405,010 A * | 9/1983 | Schwartz | F28D 20/0056 165/10 |
| 4,505,322 A | 3/1985 | Larson | |
| 6,631,754 B1 | 10/2003 | Bremont | |
| 2010/0252243 A1 * | 10/2010 | Huazhao | F28F 9/0273 165/174 |
| 2011/0240276 A1 * | 10/2011 | Wintersteen | F28D 1/05383 165/173 |
| 2012/0152511 A1 * | 6/2012 | Chang | B60H 1/00428 165/202 |
| 2012/0241120 A1 * | 9/2012 | Hagel | B60H 1/00492 165/10 |
| 2013/0126122 A1 | 5/2013 | Maier | |

FOREIGN PATENT DOCUMENTS

| | | |
|---|---|---|
| DE | 1939534 A1 | 2/1971 |
| DE | 2444217 A1 | 4/1976 |
| DE | 2721173 A1 | 11/1978 |
| DE | 3106822 A1 | 10/1982 |
| DE | 3124021 A1 | 1/1983 |
| DE | 3136607 A1 | 4/1983 |
| DE | 3036762 C2 | 9/1989 |
| DE | 102004019801 A1 | 11/2005 |
| DE | 102011000655 A1 | 8/2011 |
| DE | 202011106852 U1 | 2/2012 |
| FR | 2230953 A1 | 12/1974 |
| GB | 2237629 A | 5/1991 |
| JP | S61265494 A | 11/1986 |
| WO | 0169155 A2 | 9/2001 |
| WO | 2009103106 A2 | 8/2009 |
| WO | WO 2009103106 A2 * | 8/2009 ............ F02C 1/04 |
| WO | 2010060524 A1 | 6/2010 |
| WO | 2012017041 A2 | 2/2012 |
| WO | WO 2012017041 A2 * | 2/2012 ......... F28D 20/0056 |

* cited by examiner

Charging the heat accumulator by
introducing a relatively hotter gas
into the passage of the inflow surface

↓

Terminating the introduction at a
point in time which lies before a
point in time at which the heat
accumulator would be fully charged

FIG 7

HEAT ACCUMULATOR FOR POWER PLANT CAPACITIES

CROSS REFERENCE TO RELATED APPLICATIONS

This application is the US National Stage of International Application No. PCT/EP2013/055914 filed 21 Mar. 2013, and claims the benefit thereof. The International Application claims the benefit of German Application No. DE 102012205771.4 filed 10 Apr. 2012. All of the applications are incorporated by reference herein in their entirety.

FIELD OF INVENTION

The present invention relates to a heat accumulator for storing at least 100 MWh of thermal energy from a relatively hotter gas in a charging state and for yielding this thermal energy to a relatively colder gas in a discharging state. The invention also relates to a method for charging and discharging such a heat accumulator.

BACKGROUND OF INVENTION

Heat accumulators for storing large quantities of thermal energy from power plant capacities are typically used as seasonal accumulators for the temporary storage of surplus energy from the power generation. Thus, for economical reasons it can be proved to be advantageous to temporarily store surplus energy—which is generated outside of the peak load times—in thermal form. The surplus energy can be extracted from conventional power generation or also be provided by means of regenerative power generation, especially thermosolar power generation.

From DE 10 2004 019 801 A1 it is known, for example, to temporarily store thermal energy from a gas flow by means of a gas-sand heat exchanger. The heat transfer is carried out in this case in a shaft which has porous walls which are connected to a gas inlet or gas outlet. Located inside the shaft is a sand section which ensures that the sand located therein is moved through the shaft at an adjustable speed. During operation of the gas-sand heat exchanger hot gas flows through the porous shaft wall into the chamber which is filled with sand and via direct heat contact partially transfers the heat energy to the sand grains. After that, the thereby heated sand can then be stored in a suitable manner and made available again to a heat extraction at a later time for a thermal reconversion application, for example.

However, the relatively cost-intensive operation of such a plant is disadvantageous to such a heat accumulator since the sand also has to be re-manipulated during extraction of the thermal energy in order to transfer its thermal energy to a flowing medium. Furthermore, an only relatively small quantity of heat can be transferred to the sand as heat storage medium, i.e. a relatively high power loss is to be taken into consideration. What is proved to be a further disadvantage of such a plant which is known from the prior art is that it has movable machine parts which can be vulnerable and therefore very maintenance intensive. This in turn results in undesirable downtimes and therefore financial losses on the part of the operator of such a plant.

Further disadvantages of the heat accumulators which are known from the prior art lie in their high costs for achieving an adequate thermal insulation. Even in the storage of thermal energy at a relatively high temperature level (>100° C.) in comparison to typically prevailing ambient temperatures the costs for the provision of an adequate insulation proves to be high. Since, moreover, heat accumulators for the storage of surplus energy from power plant capacities are of relatively large dimensions, the costs for achieving an adequate thermal insulation are sometimes crucial to whether the heat accumulator can be operated economically or not.

SUMMARY OF INVENTION

It is therefore an object of the present invention to provide a suitable heat accumulator which can enable a cost-effective seasonal storage of surplus energy produced in a power plant but to avoid the disadvantages which are known from the prior art. It is a further object of the invention to propose a heat accumulator, the costs of which for the provision of an adequate thermal insulation do not call into question the economical operation.

The objects upon which this invention is based are achieved by a heat accumulator and also by a method for operating such a heat accumulator according to the claims.

The objects of the invention are especially achieved by means of a heat accumulator for storing at least 100 MWh of thermal energy from a relatively hotter gas in a charging state and for yielding thermal energy to a relatively colder gas in a discharging state, which heat accumulator in the charging state has at least one inflow surface, provided with inflow openings, for introduction of the gas, and also at least one outflow surface, provided with outflow openings, for discharging the gas after yielding heat to a granular heat storage medium, wherein the inflow surface is formed at least in certain sections to form a passage which is especially completely enclosed by the outflow surface, and wherein an interspace, in which the granular heat storage medium is located, is defined between the inflow surface and the outflow surface.

Here, and in the following text, the granularity of the heat storage medium is to be understood in such way that the heat storage medium is loose, but at the same time offers sufficient space to a gas for this to flow through it. Furthermore, the granularity is not to be limited in principle with regard to size distribution of the grains. Apart from preferred embodiments, the shape and volume distribution of individual grains is to be optional. According to the invention, however, it is essential that the shape and volume distribution of individual grains are sufficient to allow a gas flow between the individual grains. This gas flow, moreover, has to be large enough in order to be able to deposit the desired thermal energy in the heat accumulator.

In addition, the object according to the invention is achieved by means of a method for charging and discharging such a heat accumulator, wherein for the charging of the heat accumulator a relatively hotter gas is introduced into the passage so that this flows through the inflow openings of the inflow surface and on its way to the outflow openings of the outflow surface yields heat to the granular heat storage medium, wherein it flows out of the outflow openings as relatively colder gas and is discharged from the heat accumulator, and that for the discharging of the heat accumulator a relatively colder gas is introduced through the outflow openings and on its way through the granular heat storage medium absorbs heat from the granular heat storage medium, and after discharging from the inflow openings of the inflow surface is available as a relatively hotter gas.

The surplus energy which is generated by a power plant is therefore to be transferred according to the invention by means of a gaseous heat transfer medium to a suitable solid heat storage medium. The heat transfer medium may have obtained the heat transported by it in a different way. Therefore, it is conceivable, for example, that the gaseous heat transfer medium is extracted from an exhaust gas and so transfers the surplus process heat, for example of a combustion process, to the heat storage medium. By the same token, it is also conceivable that the thermal energy which is to be stored is sourced from a secondary generation process, for example from a compressor process for heat generation, wherein this generation process itself is supplied with surplus energy.

According to aspects of the invention, the heat accumulator is to be suitable for storing at least 100 MWh of thermal energy. Such large quantities of energy typically result only in conjunction with capacities which are generated by power plants within the field of application into which the present invention also falls.

After storage has been carried out, the temporarily stored quantity of heat can be fed again to a further power plant process or power generation process for utilization. In this way, with a time delay the energy can be retrieved from the heat accumulator and be available for renewed power generation when required.

The heat accumulator according to aspects of the invention is described from the point of view of the charging state with regard to its component parts. This, however, does not constitute any restriction with regard to the disclosure of the heat accumulator since to the person skilled in the art it is understandable that with reversal of the charging state, that is to say in a discharging state, the individual component parts of the heat accumulator maintain their basic functionality. If gas therefore flows through the inflow openings of the inflow surface during the charging state, then to the person skilled in the art it is understandable that during the discharging state the inflow surface fulfills the function of an outflow surface and the inflow openings fulfill the functions of outflow openings. For improved comprehensibility, the description of individual component parts of the heat accumulator may therefore be described from the point of view of the charging state.

The heat accumulator according to aspects of the invention, by means of direct heat transfer, allows energy to be extracted from the relatively hotter gas, and to be transferred to the granular heat storage medium. In this case, the relatively hotter gas flows through the inflow openings of the inflow surface into the interspace in which is arranged the granular heat storage medium. On account of a gas pressure which is to be set as desired, the relatively hotter gas flows through the free spaces which the heat storage medium has on account of its granularity. After the relatively hotter gas has flown through the entire interspace, yielding heat, it makes its way to the outflow surface and is discharged via the outflow openings in this. On account of a continuous heat yield, in the regions of the heat storage medium which are located closer to the passage of the inflow surface a temperature level is formed which is higher than in the regions which are located closer to the outflow surface. As a result, a desired temperature gradient is established as long as complete charging of the heat accumulator is not achieved.

Since the heat accumulator is provided for the temporary storage of quantities of generated surplus energy, a complete charging of the heat accumulator is typically not achieved. Rather, the heat accumulator during its operation has a desired temperature distribution, which is described above, in the heat storage medium. Consequently, however, the regions which are located closer to the outflow surface of the interspace act as a heat insulator with regard to the heat losses from the regions which are located closer to the passage of the inflow surface. The outer, relatively colder regions of this interspace which is filled with the granular heat storage medium therefore prevent a heat transfer from the relatively hotter, inner regions which are located closer to the passage of the inflow surface. This, on the one hand, has the result that the heat accumulator altogether requires a lower insulation cost since a smaller heat transfer through the outer regions of the interspace which is filled with the heat storage medium is to be expected.

Especially when the heat accumulator has been charged with a predetermined quantity of heat—but a further feed of heat via a gas is no longer carried out—is it necessary to hold back the energy absorbed in the heat accumulator as efficiently as possible until this energy can be yielded again to a relatively colder gas at a later point in time during discharging of the heat accumulator.

The storage of the generated surplus energy, however, can sometimes necessitate the storage of these quantities of heat for many hours or even days. Since the surplus energy from power plant capacities involves comparatively large quantities of energy, the energy storage is typically also carried out at a relatively high temperature level (>100° C.). In order to also be able to provide these quantities of heat energy for steam generation in a power plant process, for example, storage at a temperature level of typically more than 400° C. is required. On account of the large temperature difference in comparison to the natural ambient temperature, noticeable heat energy losses from the heat accumulator are to be feared if a suitable insulation cannot be selected. In this respect, it is also proved to be essential to efficiently insulate the heat accumulators—which is sometimes already relatively large anyway—against such a heat loss. On account of the geometry or relative arrangement of inflow surface to outflow surface provided according to the invention, a heat distribution is created in the granular heat storage medium which is arranged in the interspace, having an additional desired insulating effect with regard to the regions which already have a relatively high temperature level.

According to a further embodiment, the heat accumulator is intended for arranging on the ground. On account of the quantities of heat energy to be stored therein, the heat accumulator is to be filled with relatively large quantities of granular heat storage medium, wherein such material is preferably to be provided as heat storage medium which is common to the site and locally available.

According to a still further embodiment of the heat accumulator according to aspects of the invention, it can be provided that the passage of the inflow surface has a first symmetry which coincides with a second symmetry of at least one predetermined section of the outflow surface which encloses the passage of the inflow surface. On account of the coinciding symmetry of the inflow surface and of the outflow surface an also symmetrically formed temperature field can be established, at least in certain areas, in the granular heat storage medium.

The symmetry of this temperature field furthermore reduces a heat loss since the regions of relatively higher temperature and regions of relatively lower temperature of the granular heat storage medium are localized better. Therefore, for example the forming of hot spots, which could bring about an undesirable effective heat yield to the outside, is also less likely than in the case of a non-symmetrical overall construction.

An also suitable temperature distribution can be established if according to the embodiment the passage of the inflow surface has a first symmetry axis, the arrangement of which in the heat accumulator coincides with a second symmetry axis of at least one predetermined section of the outflow surface which encloses the passage of the inflow surface. This also preferred embodiment ensures an additionally improved symmetrical design of the temperature field inside the interspace which is filled with the granular heat storage medium. As a result of the coinciding of both symmetry axes (first symmetry axis and second symmetry axis), a temperature distribution field which is also symmetrical to these symmetry axes is formed and ensures a desired, defined temperature distribution. Therefore, it is advantageous, for example, if the relatively hotter region of the interspace which is located closer to the passage of the inflow surface is symmetrically enclosed by the relatively colder regions closer to the outflow surface in order to therefore effect a uniform insulating action upon the relatively hotter regions.

In another embodiment, it is provided that the passage of the inflow surface, as well as the at least one section of the outflow surface enclosing this, have a cylindrical symmetry and the section of the outflow surface is arranged coaxially relative to the inflow surface. The cylindrical symmetrical forming of inflow surface and outflow surface in conjunction with a coaxial arrangement of both relative to each other, ensures an especially uniform temperature distribution inside the granular heat storage medium in the interspace of the heat accumulator. As a result, a relatively uniform and defined colder zone, which is located closer to the outflow surface, is also formed around a relatively hotter zone which is arranged closer to the passage of the inflow surface and counteracts the heat loss in a way comparable to an insulation layer. Furthermore, during a discharging state of the heat accumulator a uniform gas temperature can also be ensured since a uniform heat yield from the heat accumulator is ensured regardless of the direction from which the gas flows into the passage of the inflow surface.

According to a further embodiment of the heat accumulator according to aspects of the invention, the passage of the inflow surface can be closed off at the end on one side, wherein the end closure especially has inflow openings. On account of the closure, it is ensured that all the gas which flows into the passage of the inflow surface is transferred through the inflow openings into the interspace of the heat accumulator. As a result of the geometric arrangement of the closure, moreover, influence is exerted upon the temperature profile which develops in the heat accumulator during the charging state. By the provision of inflow openings in the closure, regions which are arranged beneath the closure and filled with the granular heat storage medium can therefore also be used for heat storage. In this case, it is to be noted that in the case of an arrangement of the heat accumulator on the ground the height level of the closure should not reach the level of the ground. The suitable height at which the closure can be arranged in order to therefore ensure a heat transfer which is as efficient as possible into the heat accumulator results from numerous geometric and also process parameters.

According to a further embodiment of the invention, the number of inflow openings per unit area in the passage increases in the flow direction of the inflowing gas. Therefore, relatively more inflow openings per unit area are arranged in the passage on the outflow side. As a result, convection phenomena in the heat accumulator, which bring about a deformation of the temperature distribution field, can be counteracted. If, for example, the passage of the inflow surface, following the direction of the earth's gravitational field, extends from the top downwards in a heat accumulator which is arranged on the ground, a broadening of the temperature distribution profile is preferably established further up in the interspace since the relatively hotter air, in comparison to the heavier, relatively colder air, rises upwards. Convection phenomena make themselves felt in the developing temperature profile especially when the flow velocities of the relatively hotter gas in the granular heat storage medium are comparatively low (e.g. 0.1 to 0.2 m/sec). In order to therefore supply these regions with less heat, in the passage according to the embodiment less gas volume per time flows directly into these regions. Relatively more gas is delivered into the heat accumulator through the increased number of inflow openings per unit area in the outflow-side region of the passage. As a result, a higher temperature preferably develops in these regions as a result of an increased heat transfer to the granular heat storage medium. The gas which is present in these regions admittedly also flows as a result of convection into the regions located thereabove, but altogether less heat is deposited in the regions of the interspace of the heat exchanger which lie relatively higher up. Consequently, a temperature profile which is less distorted as a result of the convection influence is established.

According to an alternative embodiment, it can also be provided that the size of the inflow openings per unit area in the passage increases in the flow direction of the inflowing gas. The advantages of such an arrangement correspond to those of the preceding embodiments.

According to a further embodiment of the heat accumulator, it is provided that the passage, which is formed by the inflow surface, has a rectilinear progression which is especially oriented in the heat accumulator parallel to the direction of the earth's gravitational field. As a result of this orientation, the effects of convection inside the heat accumulator are distributed relatively symmetrically and equally, and they can be counteracted by measures which are simple to apply. Consequently, such an arrangement again allows the forming of a relatively equally distributed or symmetrical temperature distribution field inside the heat accumulator.

According to a further embodiment of the invention, it is provided that the inflow surface is a metal surface, especially a surface made from steel, which is provided with first cutouts as inflow openings. Alternative materials for this can be brick, ceramic or glass. A metal surface is preferred, however, since this on the one hand is to be provided inexpensively and on the other hand also satisfies the demands on the operating temperature and the mechanical properties. Therefore, it is a requirement, for example, that the inflow surface at least partially supports the granular heat storage medium which is located in the interspace. As a result of the large quantities of granular heat storage medium which are sometimes held by the heat accumulator, the forces upon the inflow surface which occur in the process are considerable so that this has to be of a mechanically very resilient design. Metal is especially suitable for this purpose.

According to a further embodiment of the heat accumulator according to the invention, the granular heat storage medium can comprise a bulk consisting of stones. Therefore, pebbles, for example, can be used as well as fragments of stone or brick chippings. These are easy to acquire and are inexpensive. Even metal chippings may be suitable as granular heat storage medium, however, since on the one hand they have a large heat capacity, but on the other hand can also provide sufficient free spaces for the gas flow. Locally available media are preferably used in the heat accumulator. On account of the relatively large quantities of heat storage medium which are held by the heat accumulator, waste or inexpensive building materials, such as stones, are especially suitable. In order to therefore advantageously distribute these in the heat accumulator or in the interspace of the heat accumulator, it is necessary that these are loose or at least distributable. A loose and at the same time granular heat storage medium comprises individual grains, or a fragment of stone, which are individualized by other component parts.

According to a further embodiment of the present invention, it can be provided that the bulk of granular heat storage medium has an average grain size of at least 1 cm in diameter, preferably an average grain size of at least 3 cm in diameter. Such grain sizes allow the forming of sufficiently large free spaces between individual grains so that the relatively hotter gas, which is introduced for heat yield into the heat accumulator, can flow through the granular heat storage medium without excessive flow resistance. This especially applies to flow resistances at flow velocities of the gas of 0.1 to 0.5 msec.

A further advantageous embodiment of the heat accumulator according to the invention is achieved when the bulk of granular heat storage medium is arranged in the heat accumulator in layers and a gas-impermeable convection barrier for the gas is provided between the individual layers. The layers can extend in this case over the entire interspace of the heat accumulator, or only over parts, however. The convection barriers, moreover, can be also be designed as partially gas-permeable convection barriers. It is only essential that the convection barriers enable a deflection of the convecting gas. Therefore, the convection barriers are provided, for example, so that the gas during the convection process impinges upon the convection barriers and is diverted by these into other areas. Especially when the convection barriers are arranged horizontally can an efficient convection prevention be achieved by means of the barriers. As a result of the convection barriers, the gas which is introduced into the heat accumulator is diverted in such a way that it counteracts the forming of a temperature distribution level which is excessively deformed as a result of the convection. The forming of a suitable temperature distribution profile can be encouraged specifically owing to the fact that the relatively hotter gas, which flows in through the inflow openings of the inflow surface, cannot move freely against the gravitational force as a result of the convection, but is directed through the convection barriers.

According to a further embodiment of the present invention, the outflow surface can be a metal surface, especially a surface made from steel, which is provided with second cutouts as outlet openings. As previously in the case of the inflow surface, the outflow surface can alternatively also consist of brick, ceramic or glass. On account of the high costs which are to be foreseen for the outflow surface when using other materials, metal is the preferred material.

According to a further embodiment, it can be provided that the inflow surface and/or the outflow surface supports the granular heat storage medium by contact. The inflow surface or the outflow surface therefore has to therefore be able to absorb sufficient mechanical supporting force in order to support the granular heat storage medium. In this case, it is naturally understandable to the person skilled in the art that the inflow openings which are incorporated in the inflow surface and the outflow openings which are incorporated in the outflow surface may be selected to be of only such size that on the one hand the gas flow is not significantly obstructed and on the other hand the granular heat storage medium cannot pass through the inflow surface or outflow surface. The selection of a suitable size of the inflow openings and of the outflow openings is understandable to the person skilled in the art. According to the embodiment, the inflow openings or outflow openings could also be lined with suitable grids.

According to a further embodiment of the present invention, the heat accumulator is at least 10 m, preferably at least 15 m, in its vertical extent and at least 30 m, preferably at least 45 m, in its horizontal extent. The horizontal extent of the heat accumulator is especially greater than its vertical extent. According to another embodiment, the horizontal extent corresponds to a diametrical horizontal extent. Therefore, on the one hand it can be ensured that the heat accumulator can store sufficient quantities of heat for storing surplus energy from a power plant process, but on the other hand it can be minimized by and large with regard to its space requirement. It can also be conceivable to sink the heat accumulator far enough in a recess in the ground so that it no longer projects from this.

According to a further embodiment of the heat accumulator, it is provided that the outflow surface is enclosed by a thermal insulation which is at a distance from the side of the outflow surface which faces away from the granular heat storage medium and so determines an outflow passage between the outflow surface and itself, by means of which the gas issuing from the outflow openings can be discharged. In this outflow passage, the relatively colder gas issuing from the interspace of the heat accumulator is discharged. Formed on account of the typically issuing quantities of gas is a gas flow which surrounds the outflow surface and at the same time exerts an insulating effect upon this. Particularly when the gas issuing from the outflow openings is distributed uniformly through the outflow openings can the developing air flow be advantageously taken into consideration as an additional insulation layer within the overall insulation concept of the heat accumulator.

Also to be taken into consideration is that the relatively colder gas issuing from the outflow openings has already at least partially yielded its energy on its way through the interspace of the heat accumulator, and therefore has a lower temperature level. Therefore, the demands upon the thermal insulation are also lower to the effect that they are to ensure insulation of the heat accumulator at relatively lower temperatures without damage. The situation can sometimes prove to be different in the case of thermal insulations which have to limit the interspace of the heat accumulator towards the top against the upwardly convecting gas. Since higher temperatures are established in the interspace, typically in the upper regions, on account of the gas convection, thermal insulation means, which can withstand these higher temperatures but at the same time ensure good insulation, are also to be provided there.

According to a further embodiment of the present invention, it can be provided that the thermal insulation is also enclosed by a housing which is gas tight at least in certain areas. This housing which is gas tight at least in certain areas ensures that the gas issuing from the outflow openings of the outflow surface cannot flow out of the heat accumulator in an uncontrolled manner even in the event of an undesirable penetration through the thermal insulation. The housing especially assists the forming of a defined gas flow between the outflow surface and the thermal insulation or between the outflow surface and the gas tight housing.

According to a further embodiment of the invention, it is provided that the side of the passage of the inflow surface facing the outflow surface is at a distance of at least 15 m, preferably of at least 20 m, from the outflow surface.

According to this, the distance which is to be covered by the relatively hotter gas in the interspace of the heat accumulator is at least 15 m, or preferably 20 m. On account of the large flow distances, it can be ensured that the relatively hotter gas transfers a large part of its energy to the granular heat storage medium when flowing into the interspace of the heat accumulator. Moreover, these flow distances ensure the storage of large quantities of heat energy which are also able to drive power plant processes during a discharging process.

According to an embodiment of the method according to the invention, it is provided that for charging the heat accumulator the relatively hotter gas is introduced into the heat accumulator with a mass flow of at least 10 kg/sec, especially of at least 40 kg/sec. These mass flow values are especially preferred for air as the gas. As a result, it can be ensured on the one hand when the heat accumulator is being charged that sufficiently large quantities can be introduced into the heat accumulator, and on the other hand the efficiency of a heat accumulator operated in such a way can be noticeably increased.

According to a further embodiment of the method, it can be provided that the heat accumulator when being charged is not fully charged up, especially charged at most to 70% of the possible amount of energy absorption at a predetermined temperature level of the relatively hotter gas. According to other suitable embodiments, the charging of the heat accumulator to 90% or 80% at most, or even to 60% or 50% at most, of the maximum possible amount of energy absorption, can be carried out. These upper limits correspond according to the embodiment to a maximum desired charging of the heat accumulator. By avoiding the complete charging up of the heat accumulator, it can especially be ensured that the regions of the interspace filled with the granular heat storage medium which are located closer to the outflow surface can constitute a suitable heat insulation layer for the regions which are located closer to the inflow surface since they are relatively colder and therefore have lower exergetic losses. If the charging according to the embodiment is not progressed up to a maximum possible value (i.e. a complete charging with essentially an equal distribution of temperature inside the interspace which is filled with the granular heat storage medium), the relatively colder regions of the interspace which is filled with the granular heat storage medium can exert an advantageous thermal insulation with regard to the relatively hotter regions of the interspace which is filled with the granular heat storage medium.

According to a further embodiment of the method, it can also be provided that during the charging, or in a charged state, a temperature drop is formed, or has formed, towards the outflow surface between the inflow surface and the outflow surface. The charging state in this case is especially a state in which the charging is not carried out to a maximum possible value (i.e. essentially to the equal distribution of temperature inside the interspace which is filled with the granular heat storage medium). According to the embodiment, relatively colder regions are then formed and have a heat insulating effect on the relatively hotter regions of the interspace which is filled with the granular heat storage medium and can thereby counteract an exergetic energy loss. According to the embodiment, the temperature drop can be such that there is a temperature difference of at least 25%, preferably of at least 50%, between the inflow surface and the outflow surface.

According to a further embodiment of the invention, it is provided that during the charging, or in a charged state, a temperature distribution, which does not have a linear characteristic, is formed, or has formed, between the inflow surface and the outflow surface. Such a characteristic can again contribute to relatively colder regions in the interspace which is filled with the granular heat storage medium having a heat insulating effect on the relatively hotter regions of the interspace and so being able to counteract an exergetic energy loss. As a result of a suitable temperature distribution, the exergetic energy loss can be advantageously adjusted.

With reference to figures, specific exemplary embodiments of the present invention are described in detail below. In this case, the invention is not limited to these embodiments but claims the inventive idea in its most general form. Moreover, the individual features which are represented in the subsequent figures are claimed in combination with the other depicted features and also as individual features.

Furthermore, reference is to be made to the fact that the embodiments which are shown in the subsequent figures are purely schematic representations. Limitations with regard to the functionality or specificality cannot be derived therefrom.

DETAILED DESCRIPTION OF INVENTION

Figure 1:
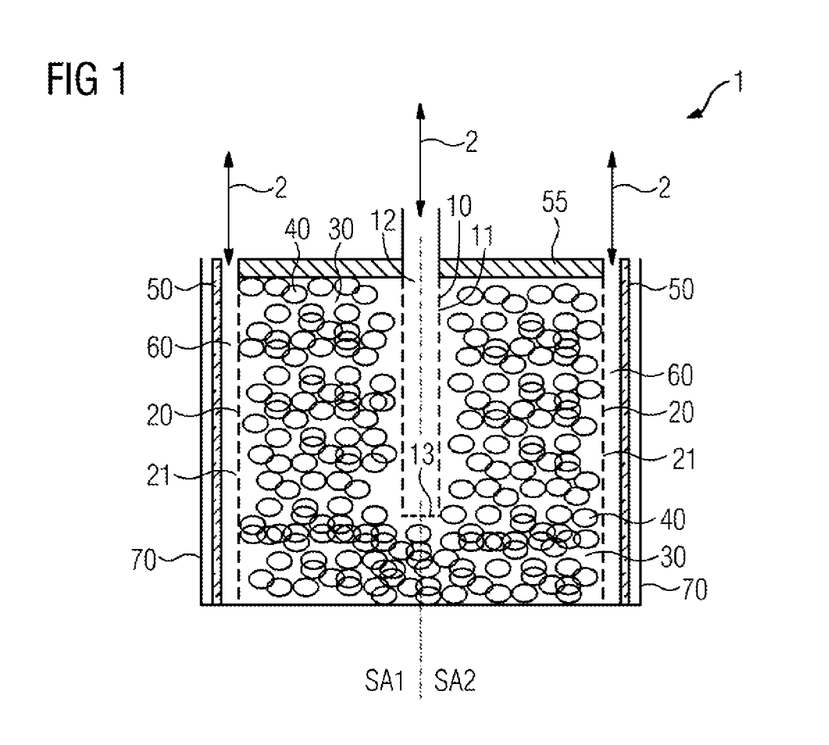
FIG. 1 shows a first embodiment of the heat accumulator according to the invention in a lateral cross-sectional view.

FIG. 1 shows a lateral cross-sectional view through a first embodiment of a heat accumulator 1 according to the invention, which for the introduction of a relatively hotter gas 2 has an inflow surface 10, provided with inflow openings 11, which is formed to produce a passage 12. During a charging process, gas 2 flows into the passage 12 and enters the interspace 30 of the heat accumulator 1 through the inflow openings 11. On account of direct heat transfer, the thermal energy of the gas is at least partially transferred to the heat storage medium 40 which is located in the interspace 30. The heat storage medium 40 has a suitable granularity so that the gas 2 can stream through or flow through the free spaces between the individual grains of the heat storage medium 40. The passage 12, depending on the embodiment, can have suitable inflow openings. The passage 12 can especially be closed off at the end by a closure 13, wherein the closure 13 itself can be provided with cutouts or openings for outflow of the gas 2.

The gas 2 which has been discharged from the passage 12 and transferred into the interspace 30 flows into the regions of the interspace 30 which are located further away from the passage 12—on account of a gas pressure building up in the heat accumulator—and finally reaches the outflow surface 20 in which outflow openings 21 are provided. On its way to there, the originally relatively hotter gas 2 partially yields its heat energy to the granular heat storage medium 40 and as relatively colder gas 2 issues from the outflow openings of the outflow surface 20, in order to be discharged. For suitable heat insulation, the outflow surface 20 is enclosed by a thermal insulation 50 and between it and the thermal insulation 50 forms an outflow passage 60. In this outflow passage 60, the relatively colder gas 2 issuing from the outflow openings 21 is discharged and consequently forms a flow layer which additionally exerts an insulating effect upon the interspace. In order to prevent gas loss from the heat accumulator 1, the thermal insulation 50 can furthermore be enclosed by an at least partially gas-impermeable housing 70 which in addition to the function of a mechanical protection can also ensure the gas tightness.

As can be seen in the illustration, the passage 12 has a cylindrical symmetrical shape which has a first symmetry axis SA1. The outflow surface 20 also has a cylindrical symmetry, the second symmetry axis SA2 of which coincides with the first symmetry axis SA1 of the passage 12. The cylindrical symmetrical passage 12 and the cylindrical symmetrical outflow surface 20 are therefore arranged coaxially to each other. As a result, it is ensured that when the heat accumulator 1 is being charged a similarly cylindrical symmetrical temperature distribution profile is established in the interspace 30 of the heat accumulator 1. On the one hand, this has the advantage that the relatively colder regions of the heat storage medium 40 in the interspace 30 which are located close to the outflow surface 20 are distributed uniformly around the hotter regions of the heat storage medium 40 which are close to the passage 12. The advantageous insulating effect which results therefrom prevents a heat loss from the relatively hotter regions which are located close the passage 12. Consequently, fewer demands are to be made on the thermal insulation 50 than would be the case if the relatively hotter regions of the heat storage medium 40 were located close to the inflow surface 20. As a result of this, the material costs and also the provisioning costs are reduced. A higher-quality insulation is to be selected according to the embodiment, however, for the thermal cover 55 which is subjected to higher temperatures. These higher temperatures primarily ensue as a result of convection of the gas which is introduced into the passage 12 during the charging state. Since much hotter gas accumulates under the thermal cover 55 as a result of the convection of the gas in the interspace 30, a higher temperature level is also achieved in these regions. As a result of this, the demands upon the thermal cover 55 are higher than upon the thermal insulation 50. If, therefore, for example the thermal insulation 50 is achieved by means of a plastic coating, then only fire-resistant stones (chamotte) can sometimes be provided for the thermal cover 55.

Figure 2:
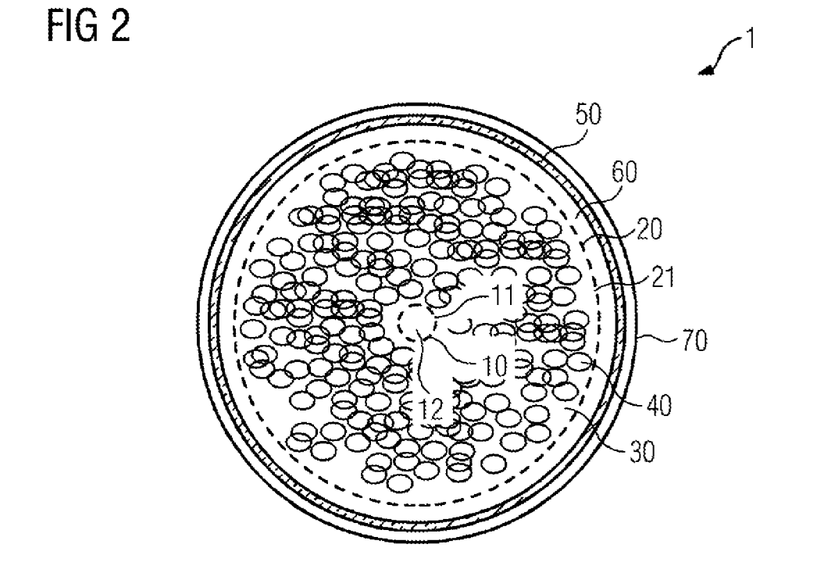
FIG. 2 shows a cross-sectional view from the top through the heat accumulator which is shown in FIG. 1.

FIG. 2 shows a cross-sectional view from the top through the heat accumulator 1 which is shown in FIG. 1. Clearly to be seen here is the cylindrical symmetrical forming of the passage 12 and also of the outflow surface 20. The grains of the heat storage medium 40 which are arranged in the interspace 30 are shown only schematically. These grains of the heat storage medium 40 can represent a suitable bulk of stones, for example. The entire interspace 30 between the inflow surface of the passage 12 and the outflow surface 20 is typically filled by the heat storage medium 40. The filling can essentially be carried out uniformly. Also conceivable, however, is the provision of passages in the heat storage medium 40 which promote a faster flow of the gas 2. As a result, the heat transfer to the heat storage medium 40 may admittedly no longer be carried out in a comparably efficient manner, but in this way the flow resistance can be suitably reduced.

Figure 3:
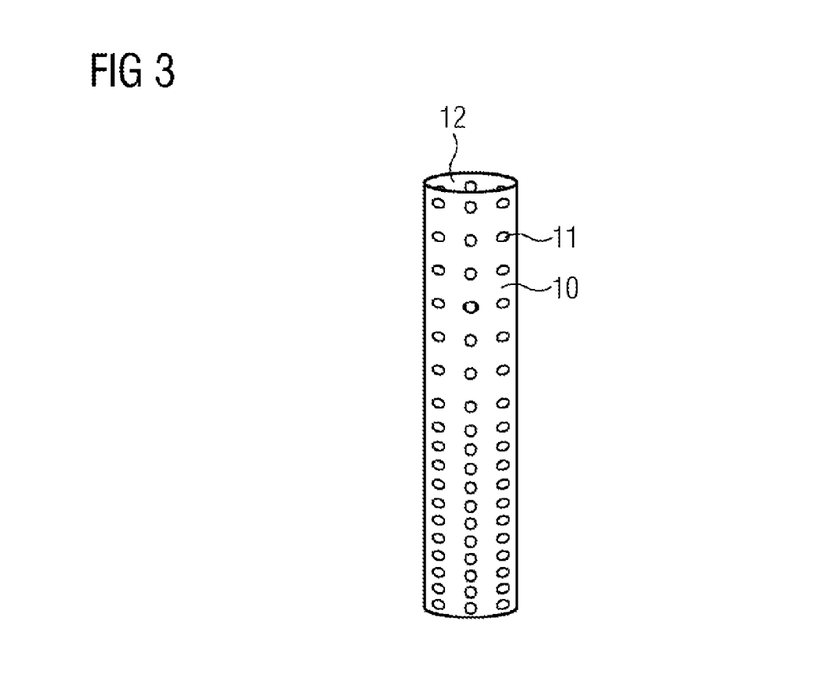
FIG. 3 shows the passage of the inflow surface, as can used, for example, in the depicted embodiments.

FIG. 3 shows a schematic view from the side of a passage 12 of the inflow surface 10 which has a number of inflow openings 11. The depicted passage can, for example, be used in the embodiment of the heat accumulator 1 which is shown in the preceding FIGS. 1 and 2. Especially shown on the passage 12 is an increase in inflow openings 11 per unit area extending from the top downwards according to the featured view. If the passage 12 is provided in conformance with an orientation in the heat accumulator 1 according to FIGS. 1 and 2, comparatively less gas would discharge in the upper regions upon entering the passage 12 but more gas would discharge in the lower regions of the passage 12. Therefore, a lower heat input into the regions which are located close to the inflow openings 11 in the upper region of the passage 12 can be ensured, but in relation to this a higher input into the regions which are located close the inflow openings 11 in the lower region of the passage 12 can be ensured. On account of the convection of the flow gradient which ensues in the interspace 30, relatively hotter gas rises from the bottom upwards, wherein at the same time it flows from the passage 12 towards the outflow surface 20. As a result, heat from the lower regions is transferred into the upper regions, wherein taking into consideration the originally lower input as a result of the lower number of inflow openings 11 per unit area in the upper region of the passage 12, a more uniform temperature profile can develop.

Figure 4:
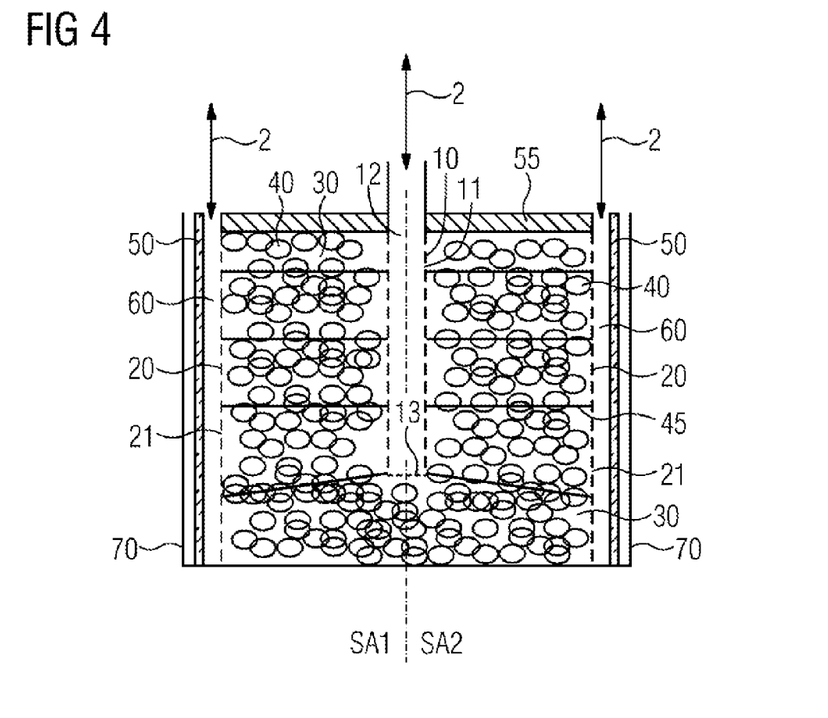
FIG. 4 shows a further embodiment of the heat accumulator according to the invention in a lateral cross-sectional view.

In order to counteract these convection effects, it can also be provided to fill the interspace 30 of the heat accumulator 1 in layers, wherein convection barriers 45 are provided between individual layers. Such convection barriers are shown in FIG. 4. These convection barriers 45 can consist of gas-impermeable, or only partially gas-permeable, material. In order to suitably direct the quantities of relatively hotter gas 2 which are introduced into the interspace 30, in order to counteract the convection effects, the convection barriers 45 can be arranged equidistantly from each other or even at irregular distances from each other. Furthermore, the convection barriers 45 can extend over the entire widths of the interspace of the heat accumulator 1 or only over partial areas thereof. Moreover, it can be advantageous not to align the convection barriers horizontally in relation to each other but to undertake an angled arrangement in relation to each other. As a result, a directed guiding of the relatively hotter gas 2 which is present in the interspace 30 can be possible in a better way.

Figure 5:
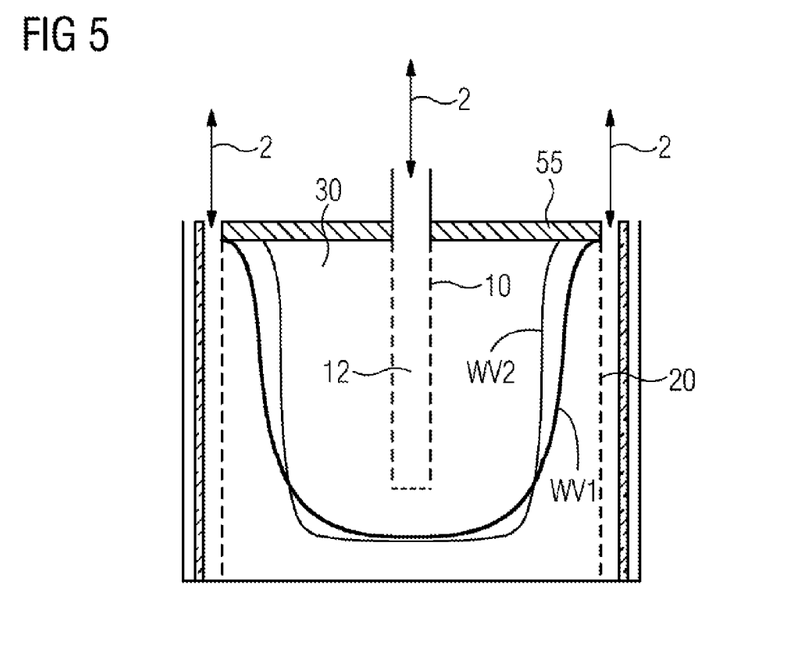
FIG. 5 shows the characteristic curve of two different heat distribution profiles, which can ensue after charging of the heat accumulator, inscribed into the outer limits of the heat accumulator.

FIG. 5 shows two different heat distribution curves (WV1 and WV2) which are schematically inscribed in an embodiment of the heat accumulator 1 according to the heat accumulator 1 which is shown in FIG. 1 and FIG. 4.

The first heat distribution curve WV1 as well as the second heat distribution curve WV2 are produced as isotherms through the interspace 30 of the heat accumulator 1 in cross section. These isotherms correspond, for example, to the temperature level of 200° C., or another temperature which is to be specified. As is easy to see, the first heat distribution curve WV1 extends close to the thermal cover 55 further towards the outflow surface 20 than the second heat distribution curve WV2. This effect ensues, for example, if the gas rises upwards on account of stronger convection of the relatively hotter gas in the interspace 30, and in regions which are located relatively further up is moved in the direction of the outflow surface 20 by the gas pressure which prevails in the interspace 30. This convection movement of the hotter gas 2 can be opposed by provision being made in the interspace 30—as shown in FIG. 4, for example,—for convection barriers 45 which no longer permit free convection from the bottom upwards but guide the gas in a directed manner in predetermined directions. If such convection barriers 45 are provided, the effect of more heat being transported by convection from the lower regions into the upper regions of the interspace 30 can therefore be avoided. The second heat distribution curve WV2, which thus illustrates a case with improved heat distribution, shows that close to the thermal cover 55 the curve reaches a point which is less close to the outflow surface 20 in comparison to the first heat distribution curve. In contrast to this, these quantities of heat, however, which are not transported by convection are deposited in the lower regions of the interspace 30. As a result of this, the second heat distribution curve WV2 also has a more pronounced lateral extent beneath the passage 12 in comparison to the first heat distribution curve WV1.

The heat distribution curves WV1 and WV2 shown in FIG. 5 are to be only schematically understood and do not originate from a thermodynamically accurate calculation. However, they adequately illustrate what influence the convection can impose upon the heat distribution inside the heat accumulator.

As already indicated in the preceding FIGS. 1 and 4 by the double arrows—which are to illustrate the flow of the gas 2—the heat accumulator 1 can be operated both in a charging state and in a discharging state. In the charging state, relatively hotter gas 2 flows into the passage 12 and flows through the interspace 30 towards the outflow surface 20. If the heat accumulator 1 is operated in the discharging state, however, relatively colder gas flows in via the outflow passage 60 through the outflow openings 21 of the outflow surface 20 and during its path through the interspace 30 absorbs heat from the heat storage medium 40, after which a relatively hotter gas flows into the passage 12 of the inflow surface 10 and can be extracted from this. For reasons of clarity, however, the charging state has preferably been considered.

Figure 6:
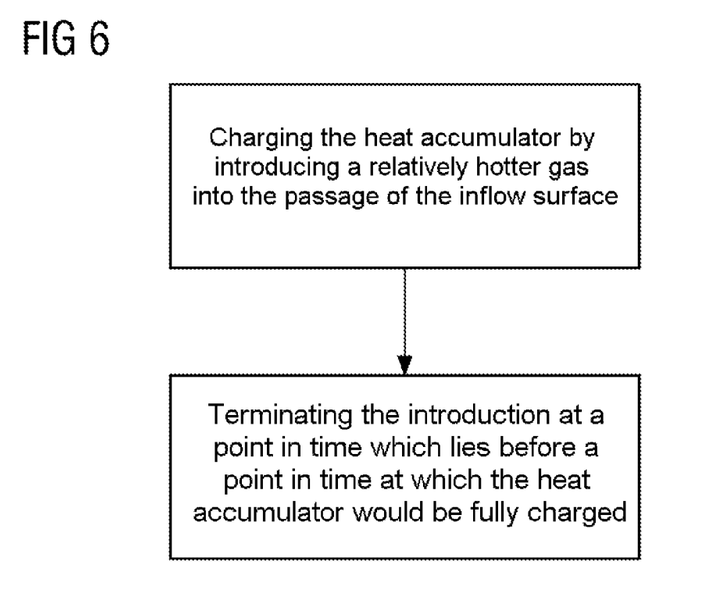
FIG. 6 shows a schematic flow diagram for representing a first embodiment of the method according to the invention.

FIG. 6 shows a schematic flow diagram for representing a first embodiment of the method according to the invention. In this case, for charging the heat accumulator relatively hotter gas 2 is introduced into the passage 12 of the inflow surface 10 of a heat exchanger 1. The introduction is terminated at a point in time which lies before a point in time at which the heat accumulator 1 would be fully charged. This state is the charging state according to the embodiment. As a result, it is ensured that the granular heat storage medium 40 in the interspace 30 has regions between the inflow surface 10 and the outflow surface 20 which are relatively colder than others. These relatively colder regions are suitable for thermally insulating the relatively hotter regions which are located closer to the inflow surface 10.

Figure 7:
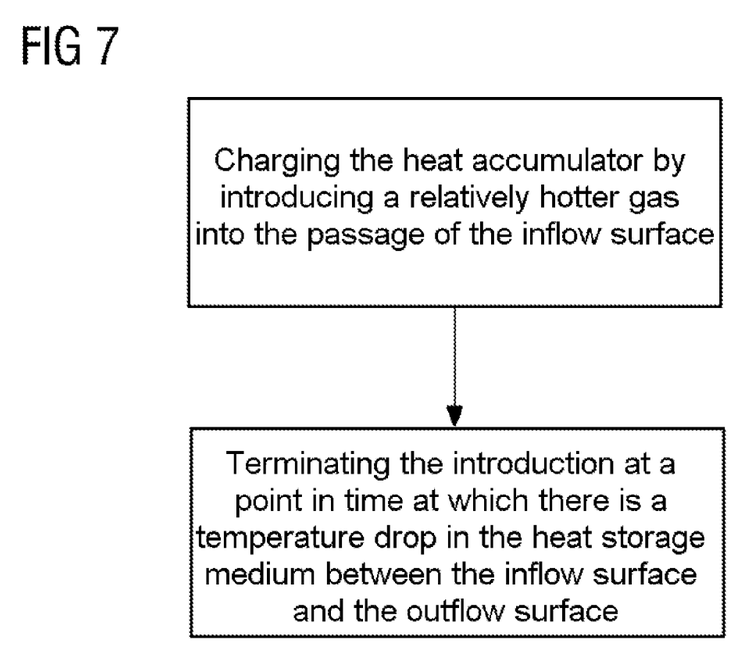
FIG. 7 shows a schematic flow diagram for representing a second embodiment of the method according to the invention.

FIG. 7 shows a schematic flow diagram for representing a second embodiment of the method according to the invention. According to this, for charging the heat accumulator relatively hotter gas 2 is introduced into the passage 12 of the inflow surface 10. The introduction is terminated at a point in time at which there is a temperature drop in the heat storage medium 40 between the inflow surface 10 and the outflow surface 20. This state is the charging state according to the embodiment. As a result, it is ensured that the granular heat storage medium 40 in the interspace 30 has regions between the inflow surface 10 and the outflow surface 20 which are relatively colder than others. These relatively colder regions are suitable for thermally insulating the relatively hotter regions which are located closer to the inflow surface 10.

Further embodiments come from the dependent claims.

The invention claimed is:

1. A heat accumulator for storing at least 100 MWh of thermal energy from a gas in a charging state and for yielding thermal energy to a gas in a discharging state, the heat accumulator comprising:
    at least one inflow surface, provided with inflow openings, for introduction of the gas, and also at least one outflow surface, provided with outflow openings, for discharging the gas after the gas passes through to a granular heat storage medium,
    wherein the inflow surface a passage enclosed by the outflow surface, and wherein an interspace, in which is arranged the granular heat storage medium, is defined between the inflow surface and the outflow surface,
    wherein the granular heat storage medium is arranged in the heat accumulator in at least two layers with a gas-impermeable convection barrier for the gas extending from the inflow surface to the outflow surface between each respective layer, wherein the convection barriers are oriented horizontally, or in such a way that the convection barriers are oriented at an angle in relation to each other, and
    wherein a number of inflow openings per unit area increases in a flow direction of the gas.

2. The heat accumulator as claimed in claim 1, wherein the passage of the inflow surface has a first symmetry which coincides with a second symmetry of at least one predetermined section of the outflow surface which encloses the passage of the inflow surface.

3. The heat accumulator as claimed in claim 1, wherein the passage of the inflow surface has a first symmetry axis, an arrangement of which in the heat accumulator coincides with a second symmetry axis of at least one predetermined section of the outflow surface which encloses the passage of the inflow surface.

4. The heat accumulator as claimed in claim 1, wherein the inflow surface as well as the at least one section of the outflow surface which encloses this have a cylindrical symmetry and the section of the outflow surface is arranged coaxially relative to the inflow surface.

5. The heat accumulator as claimed in claim 1, wherein the passage which is defined by the inflow surface has a rectilinear shape which is oriented in the heat accumulator parallel to a direction of a earth's gravitational field.

6. The heat accumulator as claimed in claim 1, wherein the granular heat storage medium comprises a bulk of stones.

7. The heat accumulator as claimed in claim 6, wherein the bulk of stones of the granular heat storage medium has an average grain size of at least 1 cm in diameter.

8. The heat accumulator as claimed in claim 7, wherein the bulk of stones of the granular heat storage medium has an average grain size of at least 3 cm in diameter.

9. The heat accumulator as claimed in claim 1, wherein the heat accumulator measures at least 10 m in a vertical extent, and at least 30 m in a horizontal extent.

10. The heat accumulator as claimed in claim 9, wherein the heat accumulator measures at least 15 m, in its vertical extent, at least 45 m, in its horizontal extent.

11. The heat accumulator as claimed in claim 1,
wherein the outflow surface is enclosed by a thermal insulation which is at a distance from a side of the outflow surface which faces away from the heat storage medium and therefore defines an outflow passage between the outflow surface and the thermal insulation, through which the gas issuing from the outflow openings can be discharged.

12. The heat accumulator as claimed in claim 1,
wherein a side of the passage defined by the inflow surface which faces the outflow surface is at distance of at least 15 m from the outflow surface.

13. The heat accumulator as claimed in claim 12,
wherein the side of the passage defined by the inflow surface which faces the outflow surface is at distance of at least 20 m from the outflow surface.

14. The heat accumulator as claimed in claim 1,
wherein the passage is completely enclosed by the outflow surface.

15. A method for charging and discharging a heat accumulator as claimed in claim 1,
wherein for charging of the heat accumulator the gas is introduced into the passage and flows through the inflow openings of the inflow surface and on the way to the outflow openings of the outflow surface yields heat to the granular heat storage medium, wherein gas flows out of the outflow openings gas and is discharged from the heat accumulator, and
wherein for discharging of the heat accumulator the gas is introduced through the outflow openings and on the way through the granular heat storage medium the gas absorbs heat from the granular heat storage medium and is discharged from the inflow openings of the inflow surface,
wherein the convection barriers enable a deflection of gas convection through the heat storage medium, thereby counteracting a deformation of a temperature distribution level in the heat storage medium, and
during the charging of the heat accumulator, terminating the introduction of the gas into the passage at a state while there is still a temperature drop in the granular heat storage medium to ensure that regions of the granular heat storage medium which are located closer to the outflow surface remain relatively colder than relatively hotter regions of the granular heat storage medium which are located closer to the inflow surface, such that the relatively colder regions constitute a heat insulation layer for the relatively hotter regions, and
wherein during the charging, the heat accumulator is charged to 70% at most of a possible energy absorption quantity at a predetermined temperature level of the gas.

16. A method for charging and discharging a heat accumulator for storing at least 100 MWh of thermal energy from a gas in a charging state and for yielding thermal energy to the gas in a discharging state, the heat accumulator comprising:
at least one inflow surface, provided with inflow openings, for introduction of the gas, and also at least one outflow surface, provided with outflow openings, for discharging the gas after the gas passes through a granular heat storage medium,
wherein the inflow surface defines a passage enclosed by the outflow surface, and wherein an interspace, in which is arranged the granular heat storage medium, is defined between the inflow surface and the outflow surface,
wherein the granular heat storage medium is arranged in the heat accumulator in at least two layers with a respective gas-impermeable convection barrier for the gas extending from the inflow surface to the outflow surface between each respective layer, wherein the convection barriers are oriented horizontally, or in such a way that the convection barriers are oriented at an angle in relation to each other,
the method comprising:
wherein for charging of the heat accumulator, the gas is introduced into the passage and flows through the inflow openings of the inflow surface and on the way to the outflow openings of the outflow surface yields heat to the granular heat storage medium, wherein the gas flows out of the outflow openings and is discharged from the heat accumulator, and
wherein for discharging of the heat accumulator, the gas is introduced through the outflow openings and on the way through the granular heat storage medium the gas absorbs heat from the granular heat storage medium and is discharged from the inflow openings of the inflow surface,
wherein the convection barriers enable a deflection of gas convection through the heat storage medium, thereby counteracting a deformation of a temperature distribution level in the heat storage medium, and
during the charging of the heat accumulator, terminating the introduction of the gas into the passage at a state while there is still a temperature drop in the granular heat storage medium to ensure that regions of the granular heat storage medium which are located closer to the outflow surface remain relatively colder than relatively hotter regions of the granular heat storage medium which are located closer to the inflow surface, such that the relatively colder regions constitute a heat insulation layer for the relatively hotter regions,
wherein during the charging, the heat accumulator is charged to 70% at most of the possible energy absorption quantity at a predetermined temperature level of the gas.

* * * * *